United States Patent [19]

Bejczy et al.

[11] Patent Number: 4,694,153
[45] Date of Patent: Sep. 15, 1987

[54] LINEAR ARRAY OPTICAL EDGE SENSOR

[75] Inventors: Antal K. Bejczy, Pasadena; Howard C. Primus, La Crescenta, both of Calif.

[73] Assignee: California Institute of Technology, Pasadena, Calif.

[21] Appl. No.: 792,450

[22] Filed: Oct. 29, 1985

[51] Int. Cl.$^4$ .................................................. G05B 1/00
[52] U.S. Cl. ..................................... 250/202; 318/577
[58] Field of Search ....................... 250/202, 560, 578; 318/577

[56] References Cited

U.S. PATENT DOCUMENTS

| | | | |
|---|---|---|---|
| 3,781,115 | 12/1973 | Rader et al. | 356/167 |
| 3,883,735 | 5/1975 | Murphy et al. | 250/202 |
| 4,112,309 | 9/1978 | Nakazawa et al. | 250/560 |
| 4,427,880 | 1/1984 | Kanade et al. | 250/222.1 |
| 4,479,717 | 10/1984 | Cornillault | 356/375 |
| 4,493,968 | 1/1985 | Brown | 219/124.34 |
| 4,518,856 | 5/1985 | Blockington | 250/202 |
| 4,553,846 | 11/1985 | Hilton et al. | 356/430 X |
| 4,559,451 | 12/1985 | Curl | 250/572 X |
| 4,559,452 | 12/1987 | Igaki et al. | 250/560 |
| 4,567,347 | 1/1986 | Ito et al. | 250/202 X |

OTHER PUBLICATIONS

Sensors and Computer Aided Control of Manipulators in Space, by Antal K. Bejczy, May 3, 1979 in "Midcon 1979 Professional Program Papers".
Smart Sensors for Smart Hands No. 78-1714, by A. K. Bejczy, NOV 14-16, 1978 at the AIAA/NASA Conference on "Smart" Sensors.

Primary Examiner—Eugene R. LaRoche
Assistant Examiner—David Mis
Attorney, Agent, or Firm—Jackson & Jones

[57] ABSTRACT

A series of independent parallel pairs of light emitting and detecting diodes for a linear pixel array, which is laterally positioned over an edge-like discontinuity in a workpiece to be scanned, is disclosed. These independent pairs of light emitters and detectors sense along intersecting pairs of separate optical axes. A discontinuity, such as an edge in the sensed workpiece, reflects a detectable difference in the amount of light from that discontinuity in comparison to the amount of light that is reflected on either side of the discontinuity. A sequentially sychronized clamping and sampling circuit detects that difference as an electrical signal which is recovered by circuitry that exhibits an improved signal-to-noise capability for the system.

11 Claims, 5 Drawing Figures

LINEAR ARRAY OPTICAL EDGE SENSOR

BACKGROUND OF THE INVENTION

1. Origin of the Invention

The invention described herein was made in the performance of work under a NASA Contract and is subject to the provisions of Public Law 96-517 (35 USC 202) in which the contractor has elected not to retain title.

2. Field of the Invention

This invention relates to an optical sensing apparatus for detecting a linear surface or a discontinuity on a workpiece. More particularly, it relates to an optical sensor with an improvement in signal-to-noise capability.

3. Brief Description of the Prior Art

Optical sensors using light emitting sources and optical detection are well known for automatic welding and the like. One of the co-inventors hereof has published background papers entitled *Sensors and Computer Aided Control of Manipulators in Space* by Antal K. Bejczy, May 3, 1979, in "Midcon 1979 Professional Program Papers" copyrighted by Electronics Conventions, Inc. and *Smart Sensors for Smart Hands* No. 78-1714, by A. K. Bejczy, Nov. 14–16, 1978, at the AIAA/NASA Conference on "Smart" Sensors. The co-sponsor of the NASA project that led to this invention, Unimation, Inc., suggested that seem tracking for arc welding would be an interesting and useful industrial task for a linear array of electro-optical proximity sensors. The results of this invention followed that suggestion.

It is known prior art that a single emitter and detector having intersecting optical axes will produce two cone-shaped volumes having a cigar-shaped sensitive volume at the intersection of the optical axis of the emitter and the detector. This prior art is described and depicted in the above-noted papers. In the presence of an object to be sensed, the flat surface intersection of the two cones produces an elliptical geometrical area that reflects a given amount of light from the object, which light can be sensed by a detector. Reflected light is converted to a sensed signal emitted from the detector.

The amount of reflected signal is dependent upon these variables:

1. Distance of the object's surface from the sensor;
2. The reflectivity (or albedo) of the flat surface of the object; and
3. The tilt angle of the object's flat surface relative to the optical axis of the sensor.

These variables may be determined for any given system and application.

In a welding by robotic arm system, there are numerous sources of "noise." The noise includes background light, welding arcs, sparks, susceptibility to heat, and electrical and other spurious interference. Not only are the output signals subjected to high noise levels, but the dull colors of tools, wrought iron and the like make the useful signals very small in comparison to the noise content of the detector's output signal. Prior to the advent of this invention, such noise was a serious hindrance to a practical and successful system.

When the reflectivity of an object's surface is known and the tilt angle is minimal, then the detected signal output is a bell-shaped curve. It is known from U.S. Pat. No. 4,479,717 to Cornillault that the distance of the object to be sensed is related to the peak and shape of the bell-shaped curve. Normally, only the leading or trailing edge portion of the signal is used for distance measuring. See Column 4, lines 13 through 68, of Cornillaut '717.

The above noted Cornillault '717 patent and the following patents were turned up in a search of the invention:

| U.S. Pat. No. | Inventor |
| --- | --- |
| 4,493,968 | Brown |
| 4,427,880 | Kanade et al |
| 4,112,309 | Nakazawa et al |
| 3,781,115 | Rader et al |

Brown '968 discloses an adaptive welder with a laser-TV scan. Note that mechanical scanning is required in that the TV camera is swung back and forth rapidly across the path of the laser beam at almost right angles. See Brown '968, FIG. 2. The mechanical scanning is typical of the prior art and detracts from the advantages of simplicity and reliability. Cornillault, Kanade et al and Nakazawa et al all sense along one central optical axis. This operation is typical of prior art.

SUMMARY OF THE INVENTION

A series of independent pairs of light emitters and detectors are mounted as a linear pixel array over a workpiece to be scanned. Several pairs of electro-optical proximity sensors provide several sensitive volumes having footprints which are adjacent to or can overlap one another. These independent pairs of light emitters and detectors sense along a plurality of parallel separate optical axes, whose widths at a lateral sensing line includes the edge or discontinuity of the workpiece which is being sought. A discontinuity, such as a linear edge, in the sensed workpiece reflects a different amount of light when compared to the light that is reflected on either side of the discontinuity.

All sensing electronics are conveniently placed at a remote protected location where they are integrated with a data processing computer. This invention employs the pixel lenses of the sensing pairs which are separated from the electronics by electro-optical cables running from a remote computer location where the light-emitting and light-detecting diodes of each "pair" may be located. A sequentially synchronized clamping and sampling circuit is an implementation of correlation by a convolutional integral. The clamping and sampling circuit provides a major improvement in signal-to-noise capability for the system.

BRIEF DESCRIPTION OF THE DRAWINGS

FIG. 4 depicts a sequentially synchronous clamp and sampling circuit in accordance with this invention.

DETAILED DESCRIPTION OF THE DRAWINGS

Figure 1:
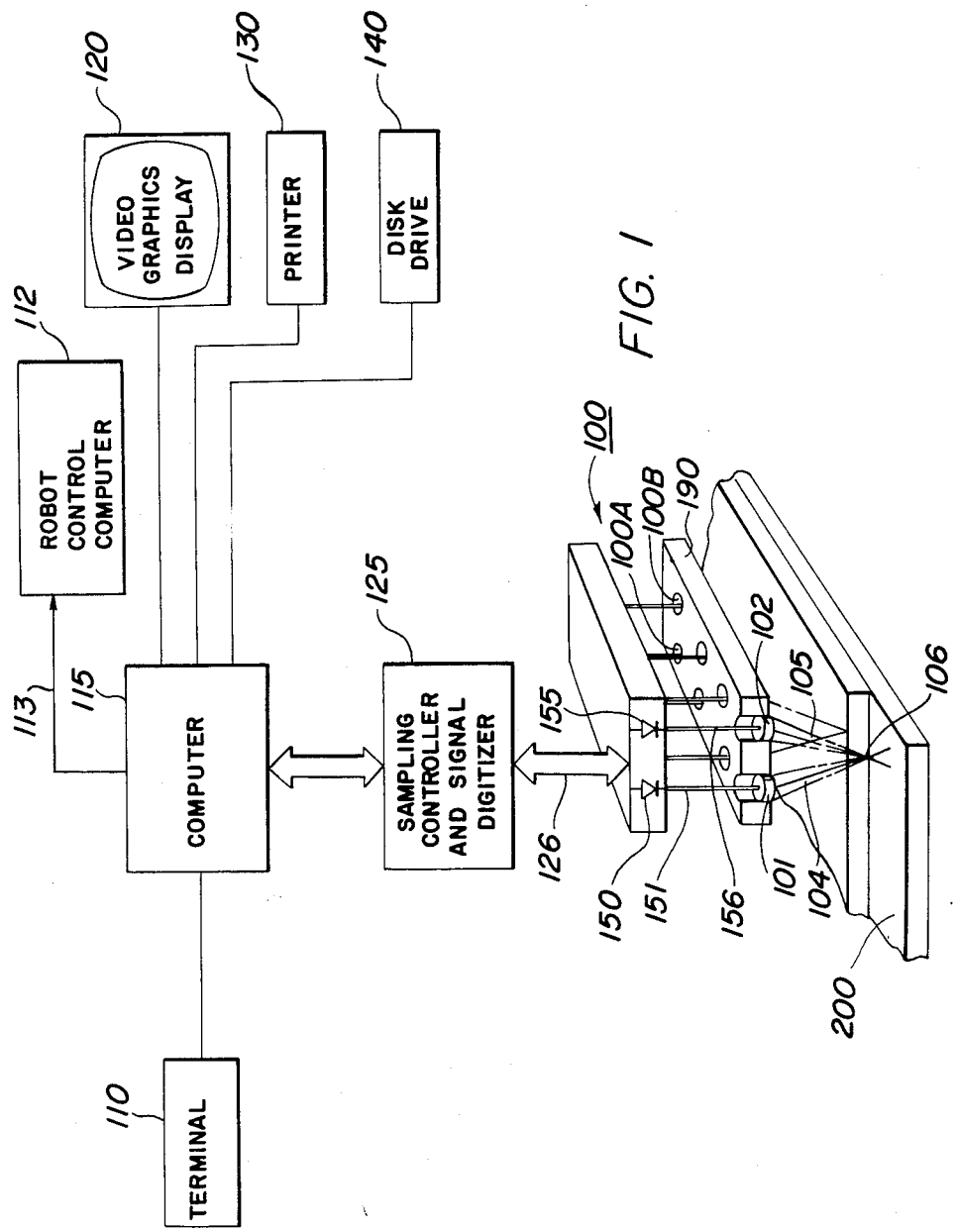
FIG. 1 is a simplified block diagram of the system of this invention.

This invention may be explained in a suitable environment, as depicted in FIG. 1, wherein a linear array 100 is shown in a cutaway perspective view. As seen in FIG. 1, the linear sensor array 100 comes about by stacking pairs of sensor units side by side. A plurality of illuminator lenses, such as lens 101, are in one row 100A and an equal number of detector lenses, such as lens 102, are in another row 100B. An illuminator lens 101 and its adjacent detector lens 102, with the corresponding emitter-detectors 150, 155, and the electro-optical light pipes 151, 156, create an intersection 106 of two optical cones 104, 105. Each pair of an emitter and detector unit defines a "pixel" in the linear array 100.

The mechanical and optical arrangement of illuminator and detector lenses defines the density or closeness of the pixel footprints in the linear array. Good position definition of a surface discontinuity along the linear array of pixels requires that the footprints of pixels should at least be adjacent to each other.

Figure 2:
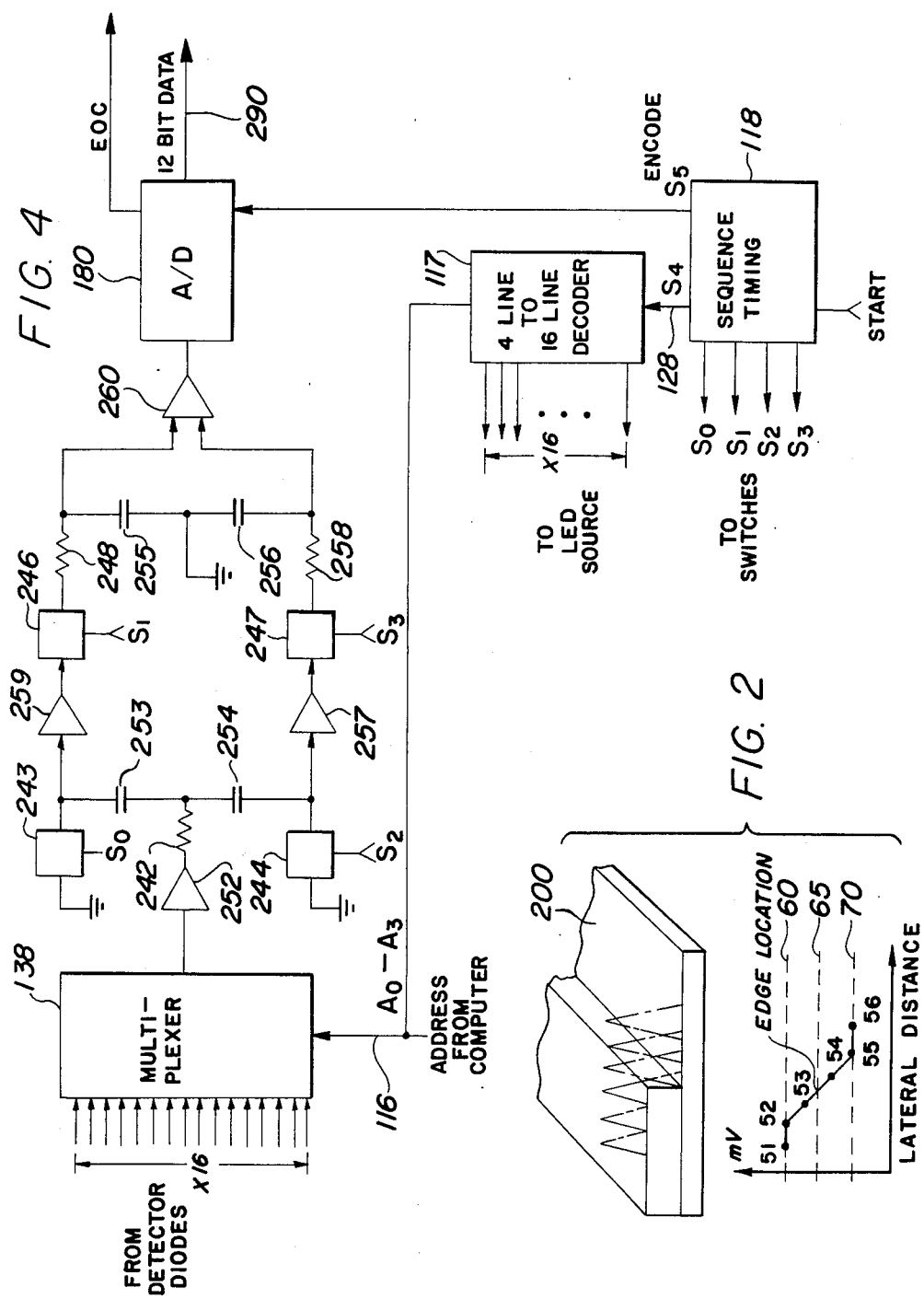
FIG. 2 symbolically depicts a lateral sensing line over a workpiece discontinuity and an array's signal profile.

FIG. 2 depicts, in symbolic form, the optical axes of several very closely located side-by-side emitter-detector pairs. Such pairs sequentially emit and detect light from the surface of workpiece 200. It is, of course, assumed that the optical array has been fixably positioned at a relatively close distance to the workpiece. Each sensor pair develops a signal which is shown simply as a dot. In the expected linear array signal profile 50 of FIG. 2, light reflected from the upper or closer surface of work piece 200 develops an upper signal level 60 as shown by dots 51 and 52. Similarly, when light is reflected from the lower surface, as shown by dots 55 and 56, a lower signal level 70 is detected. Between the discrete signal dots on the upper and lower signal levels 60 and 70 is a signal transition level trace. The transition coincides with the discontinuity in workpiece 200 and includes signal dots 53 and 54. A middle level 65, halfway between the upper and lower signal levels 60 and 70, may be determined by any well-known signal processing circuit. The intersection of middle level 65 and the transition trace defines the detected location of the discontinuity. Computerized signal processing techniques for using signals, as represented by signal dots 51 through 56, are well known and need not be described here. Suffice it to say that the midpoint of the transition trace defines the linear edge under the laterally-located pixel array. That signal, once emitted from a signal processing circuit, is employed as a reference signal to guide robotic operations, such as spot welding, at spaced intervals along a linear edge of a workpiece.

The overall system configuration of the linear array electro-optical proximity sensor system is shown in FIG. 1. A standard video data terminal 110 is used to instruct the computer 115 with the specifics of the work, initiate the task, and provide operator interaction via a known data entry terminal. Computer 115 issues instructions to a sampling controller and signal digitizing unit 125. Unit 125 samples each emitter-detector pair in sequence and receives the digitized response. Computer 115 uses the measured values to compute the position of a surface feature on a workpiece. The results of each scan during setup are displayed on the video graphics display 120. These results may also be sent to a printer 130 or saved on a disk 140. The important point to note, however, is that a suitable reference signal is emitted at terminal 113 from computer 115, which signal is readily available for use by a control computer 112. Such a computer controls a robotic arm in a well-known manner.

Figure 3:
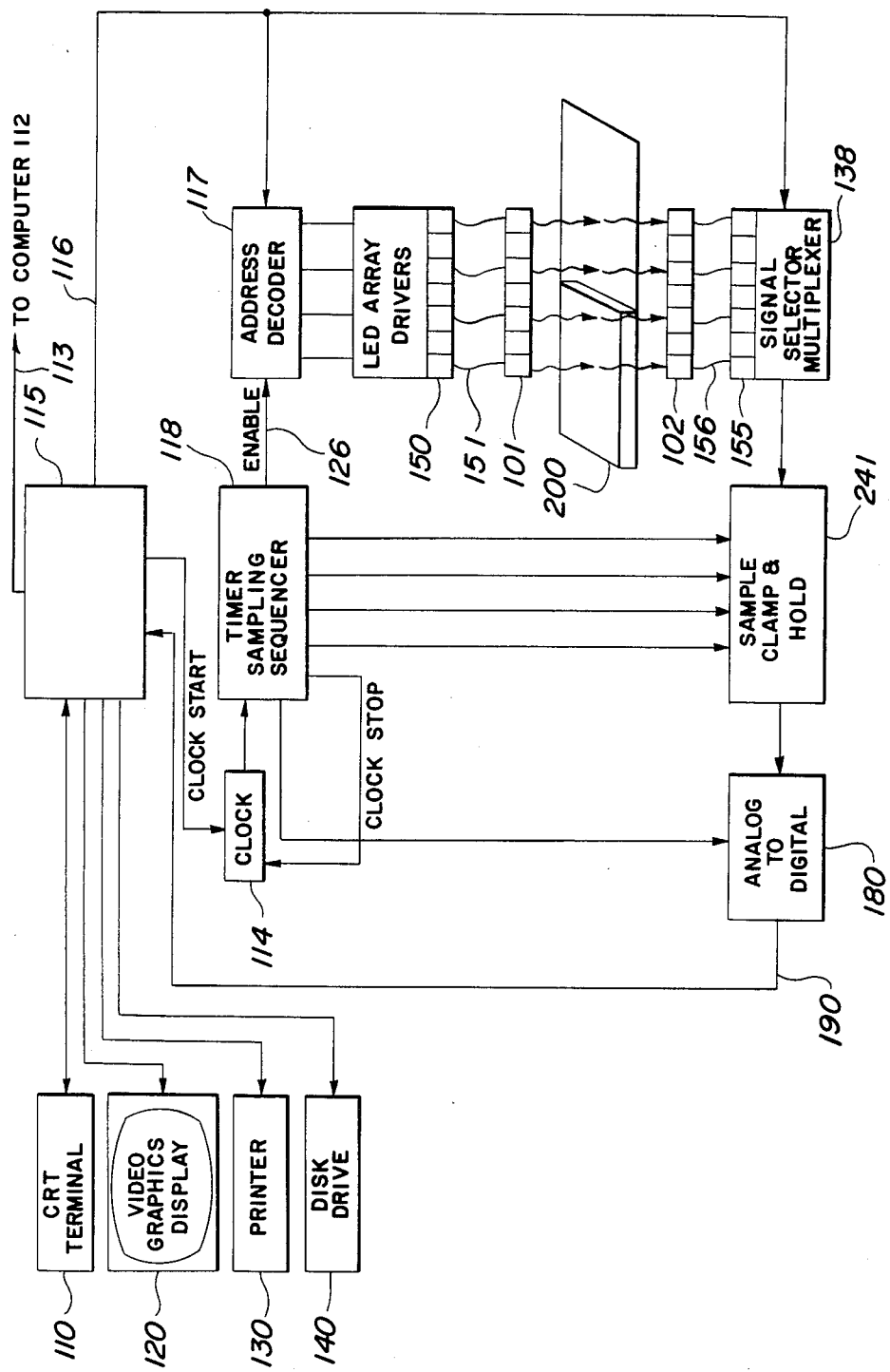
FIG. 3 is a more detailed version of the system of FIG. 1.

FIG. 3 is a more detailed block diagram of FIG. 1 which depicts the system operation of this invention. Computer 115 provides an address code on output lead 116 to an address decoder 117. A start signal from computer 115 is also applied to the clock source 114. Sampling sequencer 118 provides a plurality of control signals that define the sampling process. A source enable signal on control lead 126 turns on one of the addressed light emitting diodes, as determined by the decoded address output from address decoder 117.

Light emitted from the addressed diode, such as 150, for example, travels through a fiber optic cable 151 to a lens 101. Emitted and focussed light is directed at a specific angle to be reflected from the workpiece surface 200 and to the complimentary-positioned detector lens 102. For ease of understanding and simplicity, the lens block 190, FIG. 3, is shown as two parts above and below the work surface 200. It should be understood, however, that the preferred embodiment has been described and depicted earlier in cutaway perspective in FIG. 1. Computer 115 also supplies the same address signal to a signal selector multiplexer 138, which multiplexer responds to the address by selecting the appropriate sensor 155 of the addressed pair 150 and 155. From the lens block, the light goes through another fiber optic cable 156 to the addressed detector diode 155.

Once the multiplexer 138 has gated out a signal from detector 155, that signal must be sampled and held by the sequential and synchronous lamp and sampling circuit 241. Sampling circuit 24 is defined as synchronous because its operation is in synchronism with the multiplexing operation of signal selector multiplexer 138. It is defined as sequential because it sequentially stores a difference signal which is free from significant impairment by ambient light. It also employs clamping in order to develop a driving signal that is filtered free from ambient light and high frequency noise impairments. The driving signal drives, in turn, a differential amplifier and an analog to digital converter 180 that supplies, for example, a twelve-bit binary data output signal of lead 190 to computer 115.

Figure 5:
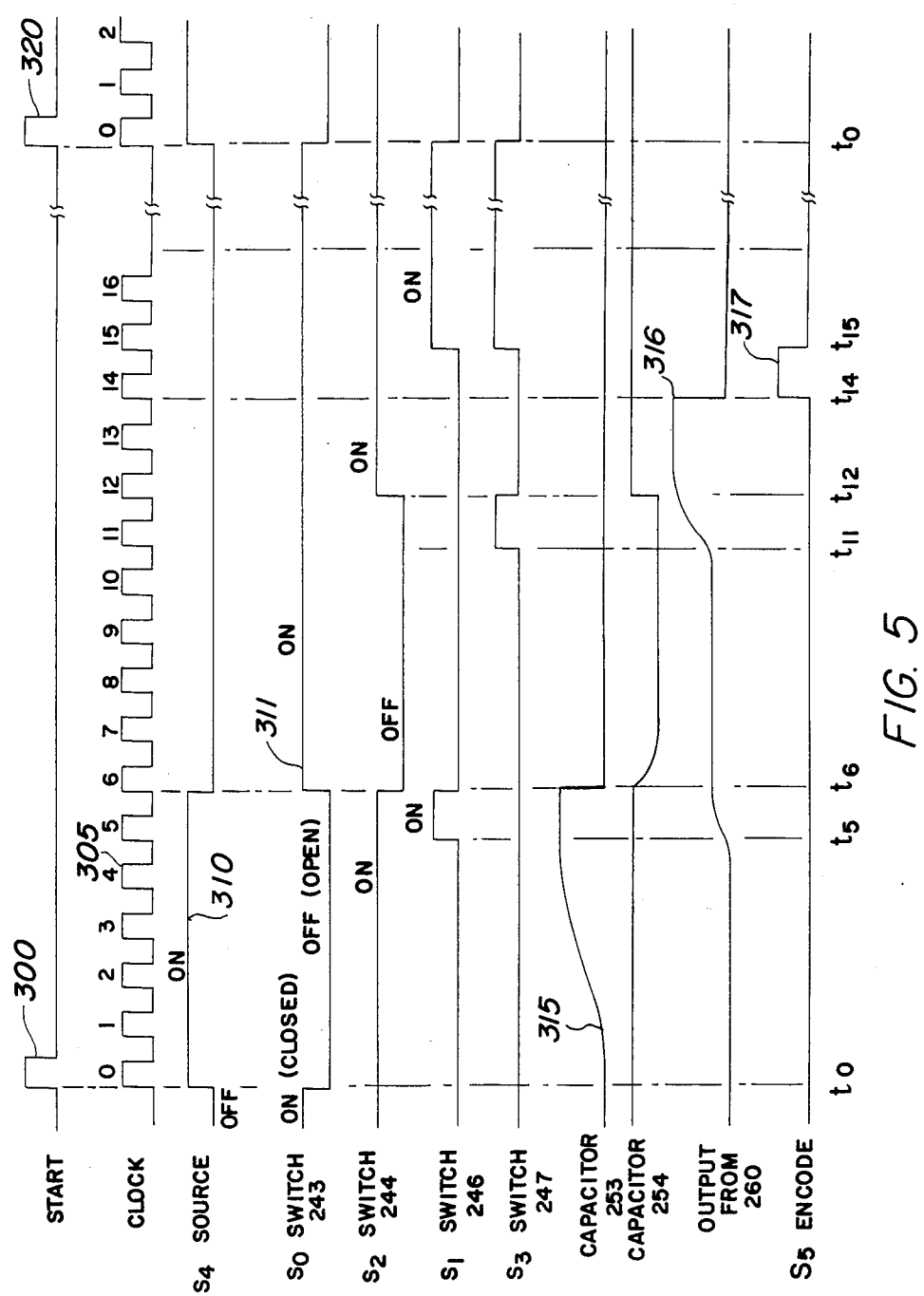
FIG. 5 is a pulse and waveform chart which is useful in describing FIG. 4 of this invention.

FIG. 4 depicts the sample clamp and hold circuit 241 in more detail. The waveforms of FIG. 5 are useful in explaining the operation of the circuit of FIG. 4. The sequence of operations for one sensor pair 150 and 155 will be described with the understanding that the operation is repeated for each emitter-detector pair. Every sensor pair may be sampled in turn, and the operation then repeated.

Sampling circuit 241 comprises four switches 243, 244, 246 and 247, which may advantageously be field effect switches. A signal selector multiplexer 138, in response to an address on lead 116 from computer 115, selects one out of sixteen separate detector input signals for this preferred embodiment. Each sampling sequence involves the computer 115 issuing an instruction in the form of a start pulse 300, FIG. 5, to sample each sensor pair, as was described earlier in connection with FIGS. 1 and 3.

Assume the system has been initialized and is in operation when the snapshot timing of FIG. 5 is taken. Light will have been coming in from one of the addressed detectors, such as detector 155, prior to time $t_0$. Thus an ambient light level has been detected and has been stored in capacitors 253 and 254.

At time $t_0$, waveform 310 turns "on" an addressed light emitting detector 151. Note that amplifier 252 has an output resistance 242, and that resistance, together with one of the two capacitors 253 and 254, acts both as a signal coupler and then as a filter, depending upon the timing sequence for switches 243 and 244. For example, when LED 151 is first turned "on" and switch 243 is "off", and resistor 242 and capacitor 253 act as a signal coupling circuit, while resistor 242 and capacitor 254 act as a filtering circuit through closed switch 244.

During clock time $t_0$ through $t_5$, as shown by waveform 311, FIG. 5, switch 243 is "off." That "off" condition acts as a high impedance, and thus the signal change delivered via amplifier 252 is coupled through capacitor 253 and through the amplifier 259. The output of amplifier 259 settles to the maximum coupled voltage just prior to time $t_5$. At time $t_5$, switch 246 is turned "on" and it stays "on" through $t_5$ and $t_6$. While switch 246 is closed, capacitor 255 is charged through resistor 248, as driven by amplifier 256 and closed switch 246. Thus, a clamped and filtered signal is present at the upper input of differential amplifier 260.

At time $t_6$, the circuit responds to a negative-going signal change which is caused when LED 151 is turned off and the circuit returns to the lower ambient light condition. At time $t_6$, switch 243 turns "on" and switch 244 turns "off". Resistor 242 and capacitor 254 act as a coupling circuit into amplifier 257, while resistor 242 and capacitor 253 act as a filtering circuit. The negative change condition settles at the output of amplifier 257 and then at time $t_{11}$, switch 247 is turned "on" and remains "on" to time $t_{12}$. This circuit action charges capacitor 256 through resistor 258. The charge is supplied to the lower side of differential amplifier 250 and is algebraically added to the earlier voltage. Waveform 316 shows the progression and final output from amplifier 260.

Since ambient light is always being detected from each diode detector, it is the change in light from an LED and detector pair which supplies the usable signal of interest. Indeed, the background light sensed by the detector is a source of noise that must be eliminated. Sampling circuit 242, including capacitors 253, 254 and switches 243, 244, acts as earlier described, as an ambient light clamping and correction means and as a high frequency filter means.

All charges on capacitors 255 and 256 must be restored to ground level before another sequence is started. In order to restore those capacitors to a ground level, switches 246 and 247 are turned "on." Similarly, switches 243 and 244 are "on." With all four switches "on" between $t_{15}$ and the new $t_0$, both sides of capacitors 255 and 256 are grounded, and they discharge through resistors 248 and 258 back to a ground level. Accordingly, waveform 316 also drops back to ground before the next sampling sequence is started.

During time $t_{16}$ through $t_0$, at the next start pulse 320, computer 115 is available for operator interaction. Once the desired computer tasks are accomplished, computer 115 addresses the next pair of LED and detector diodes. Each digitized output is stored so that a record of detected light levels is available in memory. The detected signal permits linear edge detection, robotic welding or the like.

In summary, it should now be clear that noise due both to ambient light and high frequency electrical noise is eliminated to a significant degree by this invention. Thus, a higher signal-to-noise capability is provided by this invention.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. An optical sensing system comprising:
   a plurality of pairs of, side-sy-side light omitting and detecting diodes with each pair forming one element of a linear pixel array, which array is located laterally on one side of and at a predetermined distance from a surface discontinuity of an opaque workpiece to be sensed; and
   means optically sequencing each pixel in said array for developing from transmitted and reflected light. discrete signal points defining a signal trace having upper and lower portions which bracket a transistor portion indicative of said discontinuity.

2. A system in accordance with claim 1 wherein said pixel array further comprises:
   side-by-side pairs of light emitting and collecting lenses, with each pair defining a pixel lens in said linear array.

3. A system in accordance with claim 2 and further comprising:
   optical light transmission means connecting each of said emitting diodes to each of said emitting lenses and each of said detecting diodes to each of said collecting lenses.

4. A system in accordance with claim 3 and further characterized by:
   electronic means, including said emitting and detecting diodes, located at a protected location remote from said pixel lens array location.

5. A system in accordance with claim 1 wherein said optical sequencing means comprises:
   means for sequentially emitting and detecting light from each pixel in said linear pixel array;
   light-to-signal converting means connected to said detecting means for sampling and holding electrical signals indicative of the magnitude of light detected by each of said detecting means in said pixel array.

6. A system in accordance with claim 5 and further comprising:
   a sample and hold signal circuit connected to receive each detected signal.

7. A system in accordance with claim 6 and wherein said sample and hold signal circuit includes:
   means for sampling a signal indicative of the magnitude of a signal change above an ambient light level detected by each of said detecting means; and
   high frequency noise filtering means connected to said sampling means for filtering each of said sampled signals.

8. An optical sensing system comprising:
   a plurality of side-by-side pairs of light emitting and light detecting diodes located at a remote location and connected by optical fibers to associated lens pairs arranged as a line of pixels, each having intersecting optical axes located a predetermined distance away from a linear edge of an opaque workpiece to be sensed;
   means for energizing in sequence pairs of emitting and detecting diodes from said plurality of pairs so that the light detected from the plurality of detecting diodes generates a signal indicative of a transition between two distinct light levels reflected from surfaces of said workpiece on opposite sides of a discontinuity therein; and sample and hold means connected to said plurality of detecting diodes and responsive to each energized detection diode for sampling a signal indicative of a distinct change above the ambient light signal emitted by said detecting diode, and including a high frequency filter in said sample and hold means for holding said signal substantially free of high frequency noise.

9. A system in accordance with claim 8 wherein said sample and hold means further comprises an ambient light correcting means including:

signal storing means connected to receive and store ambient light as reflected in an output signal from an energized one of said plurality of detecting diodes; and signal-change detecting means connected to said signal storage means.

10. A system in accordance with claim 9 wherein said sample and hold means further comprises a high frequency noise filter includes:

a resistive-capacitive-to-ground filtering circuit connected to said signal storage means;

switch means for switchably connecting the filtering circuit to said signal storage means; and means for applying said filtered signal-change condition to an analog-to-digital conversion circuit.

11. A system in accordance with claim 9 wherein said signal-change detecting means further comprises:

positive and negative direction signal-change detecting means responsive to both directions of change above said ambient light level.

* * * * *